(12) United States Patent
Chang et al.

(10) Patent No.: US 11,541,847 B1
(45) Date of Patent: Jan. 3, 2023

(54) WINDSHIELD WIPER STRUCTURE

(71) Applicant: Danyang UPC Auto Parts Co., Ltd., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/348,648

(22) Filed: Jun. 15, 2021

(51) Int. Cl.
    *B60S 1/34* (2006.01)
(52) U.S. Cl.
    CPC .......... *B60S 1/3475* (2013.01); *B60S 1/3436* (2013.01); *B60S 1/3463* (2013.01); *B60S 1/3472* (2013.01)
(58) Field of Classification Search
    CPC .... B60S 1/3475; B60S 1/3463; B60S 1/3468; B60S 1/3851; B60S 1/34; B60S 1/3411; B60S 1/3472; B60S 1/347
    USPC ...................................................... 15/250.44
    See application file for complete search history.

(56) References Cited

U.S. PATENT DOCUMENTS

| | | | | |
|---|---|---|---|---|
| 4,592,110 A | * | 6/1986 | Verton | .................... B60S 1/345 |
| | | | | 15/250.352 |
| 10,059,310 B2 | * | 8/2018 | Gaucher | ............... B60S 1/3874 |
| 2015/0059116 A1 | | 3/2015 | An et al. | |
| 2017/0240140 A1 | * | 8/2017 | Kim | ...................... B60S 1/3874 |

FOREIGN PATENT DOCUMENTS

| | | |
|---|---|---|
| DE | 202012103550 U1 | 10/2012 |
| EP | 3398821 A1 | 11/2018 |

OTHER PUBLICATIONS

Search Report dated Sep. 9, 2022 of the corresponding European patent application No. 22167992.1.

* cited by examiner

*Primary Examiner* — Katina N. Henson
(74) *Attorney, Agent, or Firm* — Chun-Ming Shih; HDLS IPR Services

(57) ABSTRACT

A windshield wiper structure includes a fixing frame, a support plate, a blade and at least one pressing strip. The fixing frame includes a fixing base and a pivot disposed on the fixing base. The support plate is connected on a bottom side of the fixing base and extended oppositely from the fixing base. The blade is connected to a bottom surface of the support plate. The pressing strip is disposed on the bottom side of the fixing base and presses the blade toward a direction away from the fixing base to contact with a glass surface. Therefore, the blade may be uniformly pressed to contact with a glass surface to remove rain or debris from the glass surface.

10 Claims, 7 Drawing Sheets

WINDSHIELD WIPER STRUCTURE

BACKGROUND

Technical Field

The disclosure relates to a windshield wiper, particularly to a windshield wiper structure which uniformly exerts pressing force on a windshield of a vehicle.

Related Art

A windshield wiper, which is connected to a drive arm of a vehicle and disposed on the outside of a vehicle's windshield, is a device used to remove rain or debris from the windshield by the drive arm driving a wiper blade to swing on the windshield.

In a related-art windshield wiper structure, the bottom of the fixing base connecting the drive arm is a hollow portion. The metal elastic sheet does not exert pressing force at the hollow portion of the fixing base so that the blade lacks pressing force at the fixing base and is unable to press a glass surface uniformly. As a result, a close connection cannot be maintained between a blade and a windshield and rain or debris on the glass cannot be completely removed. Therefore, how to keep a close connection between a blade and a windshield to completely remove rain is a motivation of the inventor.

SUMMARY

An object of the disclosure is to provide a windshield wiper structure which may reinforce pressing force. The blade of the windshield wiper structure may be uniformly pressed on a glass surface to contact with the glass surface to remove rain or debris from the glass surface.

To accomplish the above object, the disclosure provides a windshield wiper structure with a reinforced pressing force, which includes a fixing frame, a support plate, a blade and at least one pressing strip. The fixing frame includes a fixing base and a pivot disposed on the fixing base. The support plate is connected on a bottom side of the fixing base and extended oppositely from the fixing base. The blade is connected to a bottom surface of the support plate. The pressing strip is disposed on the bottom side of the fixing base and presses the blade toward a direction away from the fixing base to contact with a glass surface.

In comparison with the related-art windshield wiper structure which lacks pressing force at the fixing base, the disclosure includes the pressing strip disposed on the fixing base. The pressing strip presses the blade toward a direction away from the fixing base to make the blade contact with a glass surface to remove rain or debris from the glass surface. The pressing strip may be formed in a single piece with the support plate and is adjacent to the fixing base, or is disposed on the bottom side of the fixing base by riveting, fastening or welding. In addition, the pressing strip may be directly connected to the bottom portion of the fixing base by riveting, fastening or welding. Thus, the pressing force exerted by the support plate at the hollow position of the bottom portion of the fixing base may be reinforced. This makes the support plate more evenly press the blade to contact with the glass surface so as to remove rain or debris on the glass surface.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
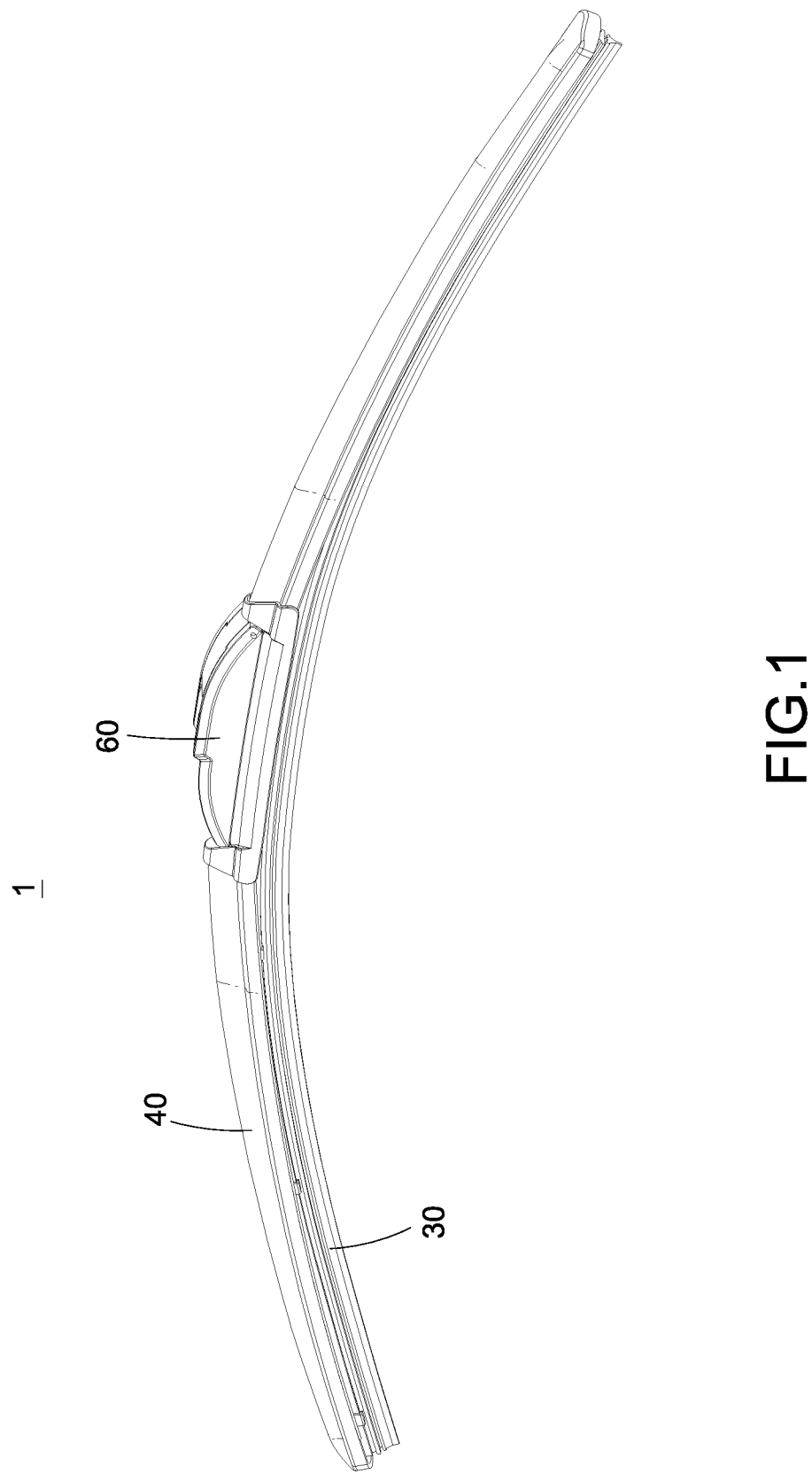
FIG. 1 is a perspective view of the windshield wiper structure with a reinforced pressing force of the disclosure.
Figure 2:
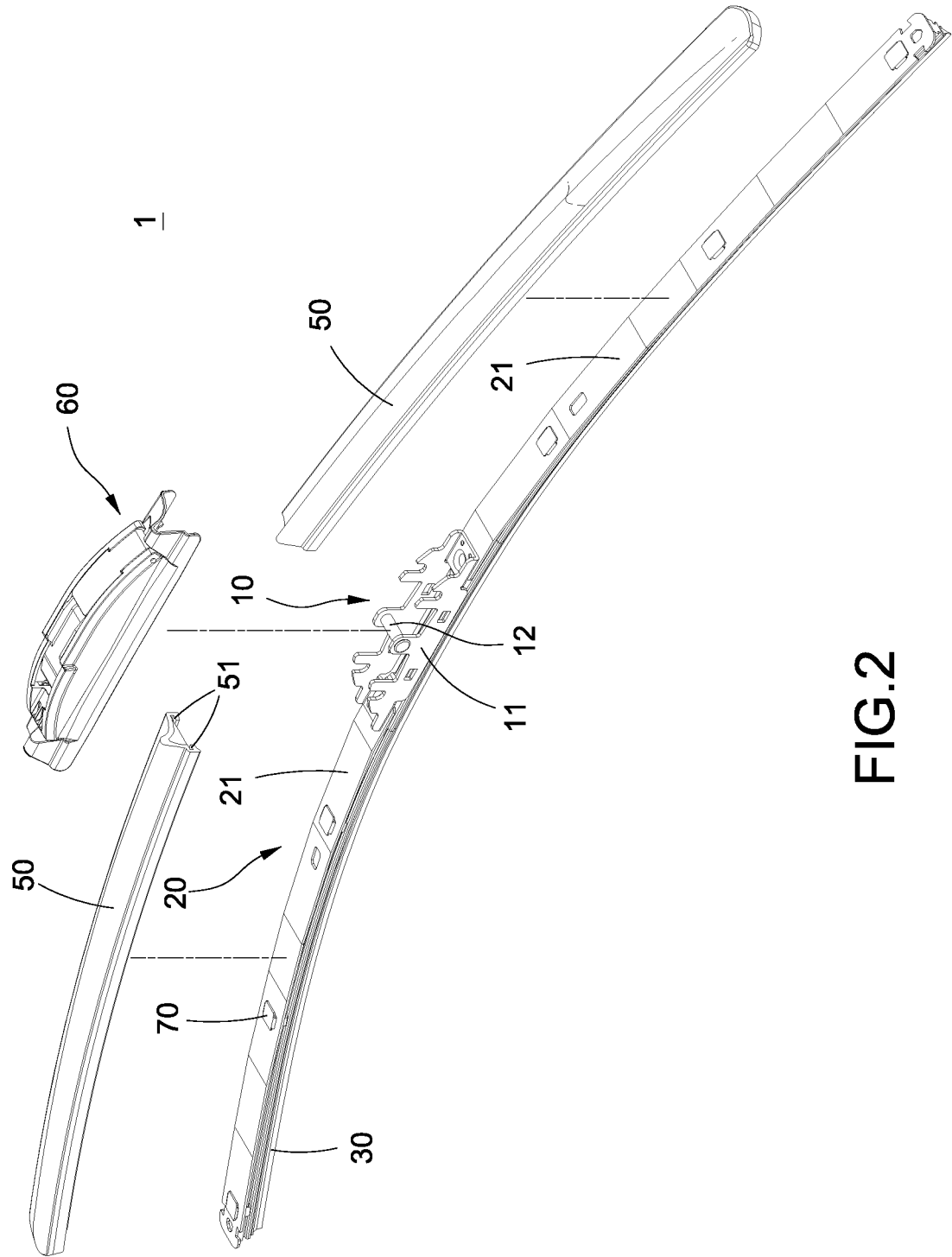
FIGS. 2 and 3 are exploded views of the windshield wiper structure with a reinforced pressing force of the disclosure.
Figure 3:
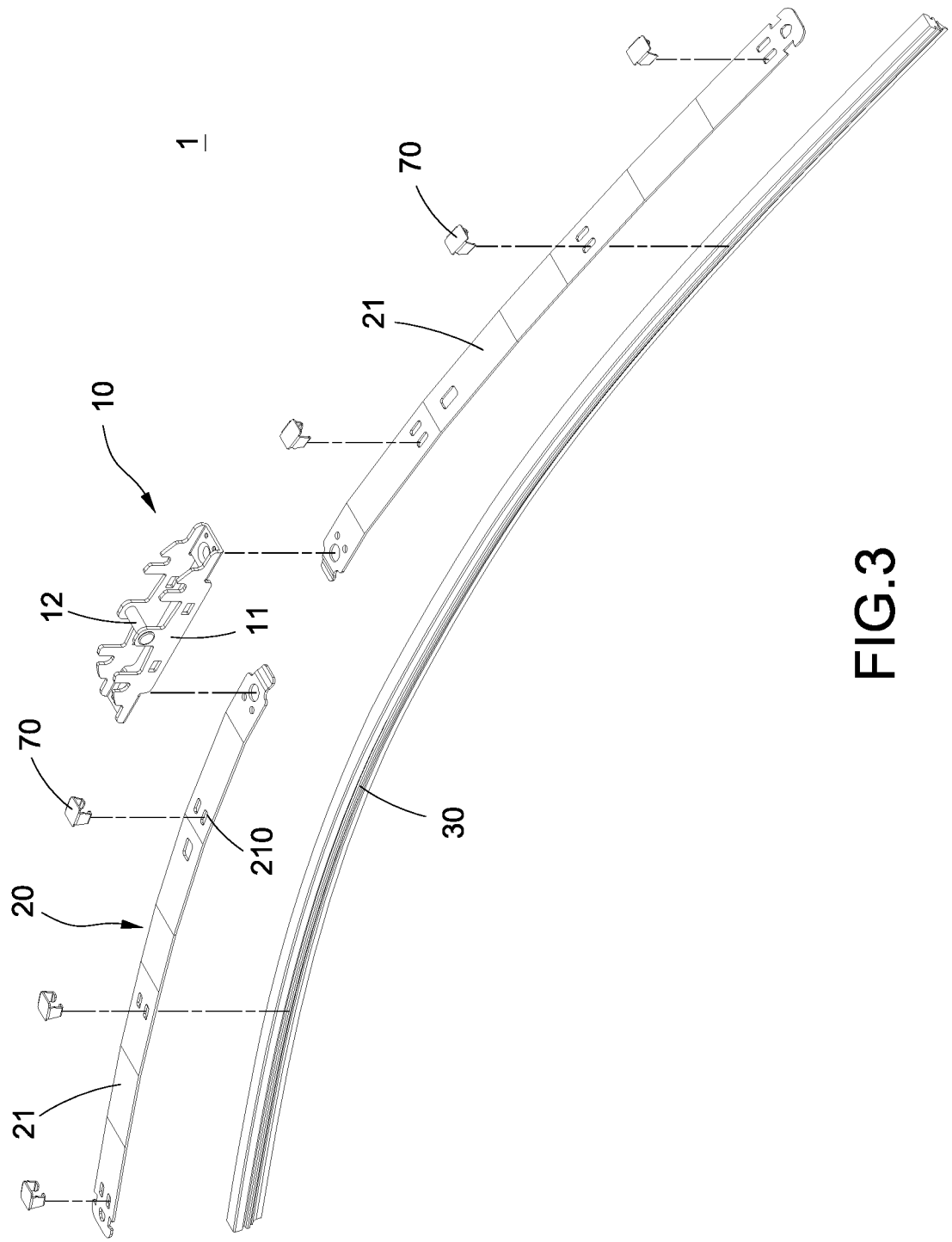

Please refer to FIGS. 1-3, which are a perspective view and two exploded views of the windshield wiper structure with a reinforced pressing force of the disclosure. The windshield wiper structure 1 with a reinforced pressing force of the disclosure includes a fixing frame 10, a support plate 20, a blade 30 and at least one pressing strip 40. The support plate 20 is connected on a bottom side of the fixing frame 10. The blade 30 is connected to a bottom surface of the support plate 20. The pressing strip 40 is disposed on a bottom side of the fixing frame 10. Therefore, the windshield wiper structure 1 with a reinforced pressing force is configured by the aforementioned elements.

The fixing frame 10 includes a fixing base 11 and a pivot 12 disposed on the fixing base 11. The pivot 12 is used for connecting a drive arm (not shown in figures) to drive the windshield wiper structure 1 to remove rain or debris on a glass surface.

The support plate 20 is made of metal to possess flexible deformation capacity. The support plate 20 is connected on a bottom side of the fixing base 11 and extended oppositely from the fixing base 11. In this embodiment, the support plate 20 includes a pair of elastic sheets 21 extended oppositely from the fixing base 11.

The blade 30 is made of rubber and is connected on the bottom surface of the support plate 20. The blade 30 is pressed by the support plate 20 to contact with a glass surface.

Also, the pressing strip 40 is disposed on the bottom side of the fixing base 11 and presses the blade 30 toward a direction away from the fixing base 11 to contact with a glass surface (not shown in figures).

In one embodiment of the disclosure, the windshield wiper structure 1 further includes a pair of covers 50, an accessory seat 60 and multiple engaging frames 70. The pair of covers 50 correspondingly covers the pair of elastic sheets 21. Each cover 50 has a pair of troughs 51. Two sides of each elastic sheet 21 pass through the pair of troughs 51 for connecting on the support plate 20. The accessory seat 60 is mounted on the fixing base 11 and sandwiched between the pair of covers 50.

In this embodiment, each of the engaging frames 70 is a U-shaped fastener. Each elastic sheet 21 has multiple insert slots 210 disposed spacedly. The engaging frames 70 pass through the insert slots 210 respectively to connect with the blade 30. As a result, the top of the blade 30 may be fastened to the engaging frames 70. The blade 30 is mounted on the bottom surface of the support plate 20 through the engaging frames 70.

Figure 4:
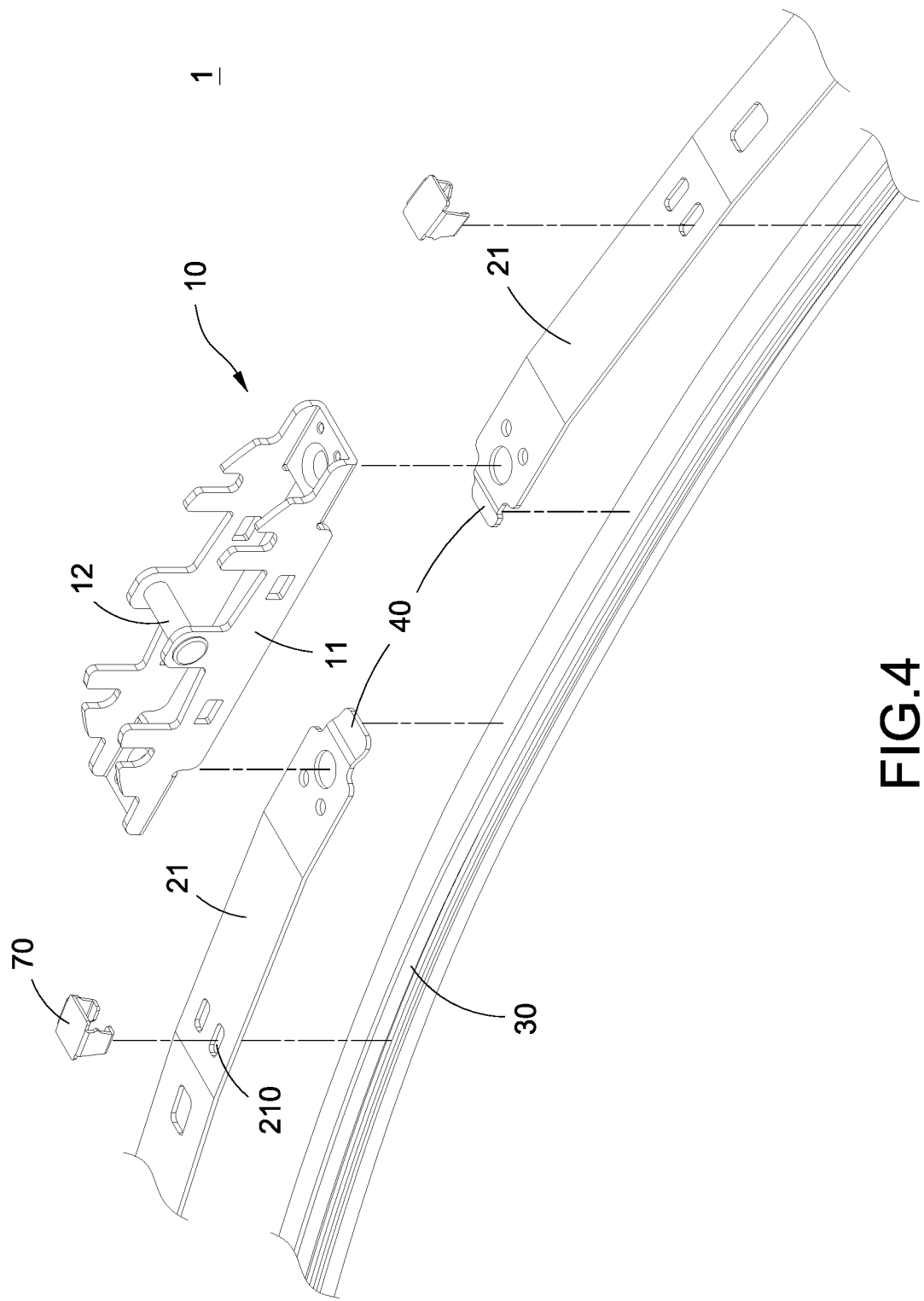
FIG. 4 is a schematic view of the pressing strip of the windshield wiper structure of the disclosure.
Figure 5:
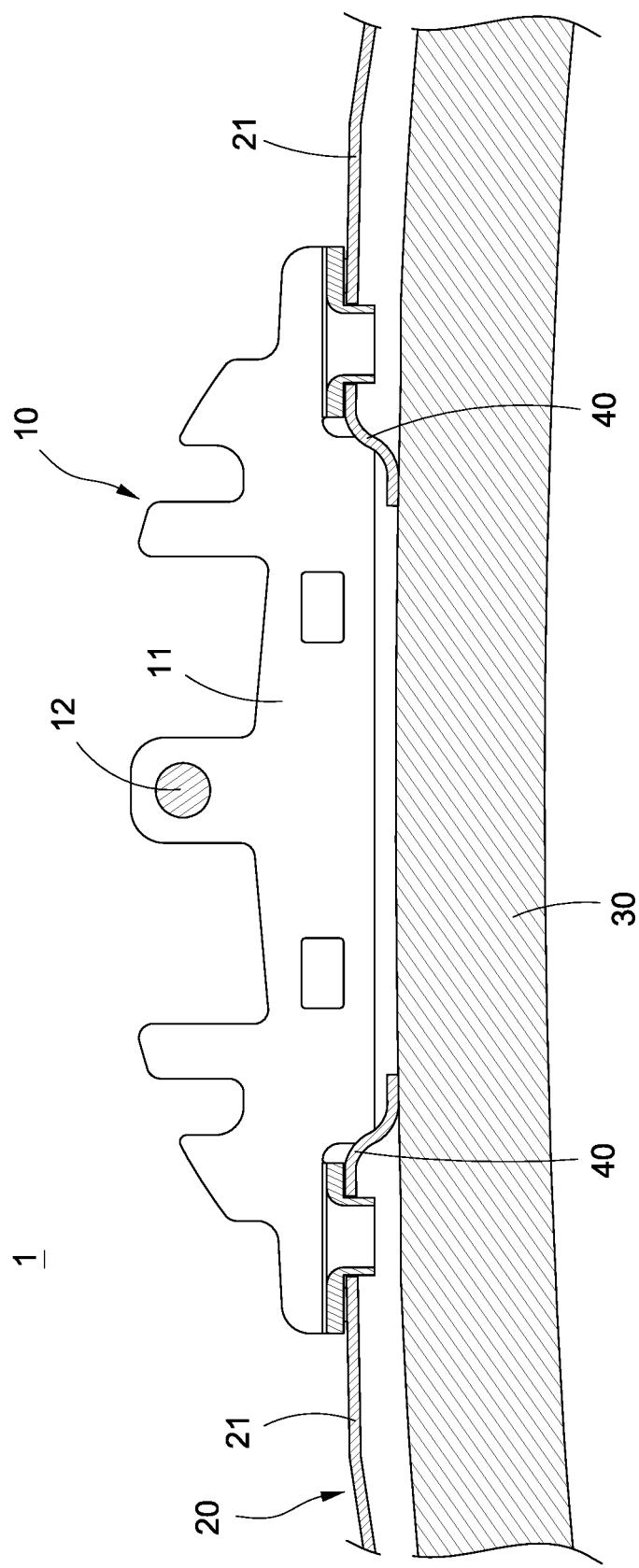
FIG. 5 is a cross-sectional view of the pressing strip of the windshield wiper structure of the disclosure.

Please refer to FIGS. 4 and 5, which are a schematic view and a cross-sectional view of the pressing strip of the windshield wiper structure of the disclosure. In an embodiment of the disclosure, the pressing strip 40 is a flexible bent strip. The support plate 20 includes a pair of elastic sheets 21, and the pressing strip 40 is a pair in number. The pair of pressing strips 40 is separately fixed on the pair of elastic sheets 21 and is adjacent to the fixing base 11. In detail, the pressing strip 40 is located at an end of the elastic sheet 21, and the pressing strip 40 and the elastic sheet 21 are formed in a single piece.

The bottom of the fixing base 11 is a hollow portion and the pair of elastic sheets 21 is separately fixed on two sides of the fixing base 11, so the support plate 20 does not press the blade 30 at the middle of the fixing base 11. Thus, the support plate 20 lacks pressing force at the position of the fixing base 11. Accordingly, the windshield wiper structure 1 of the disclosure arranges the pressing strip 40 under the fixing base 11 to reinforce the pressing force exerted by the support plate 20 at the position of the fixing base 11. This makes the support plate 20 more evenly press the blade 30 to contact with the glass surface so as to remove rain or debris on the glass surface.

Figure 6:
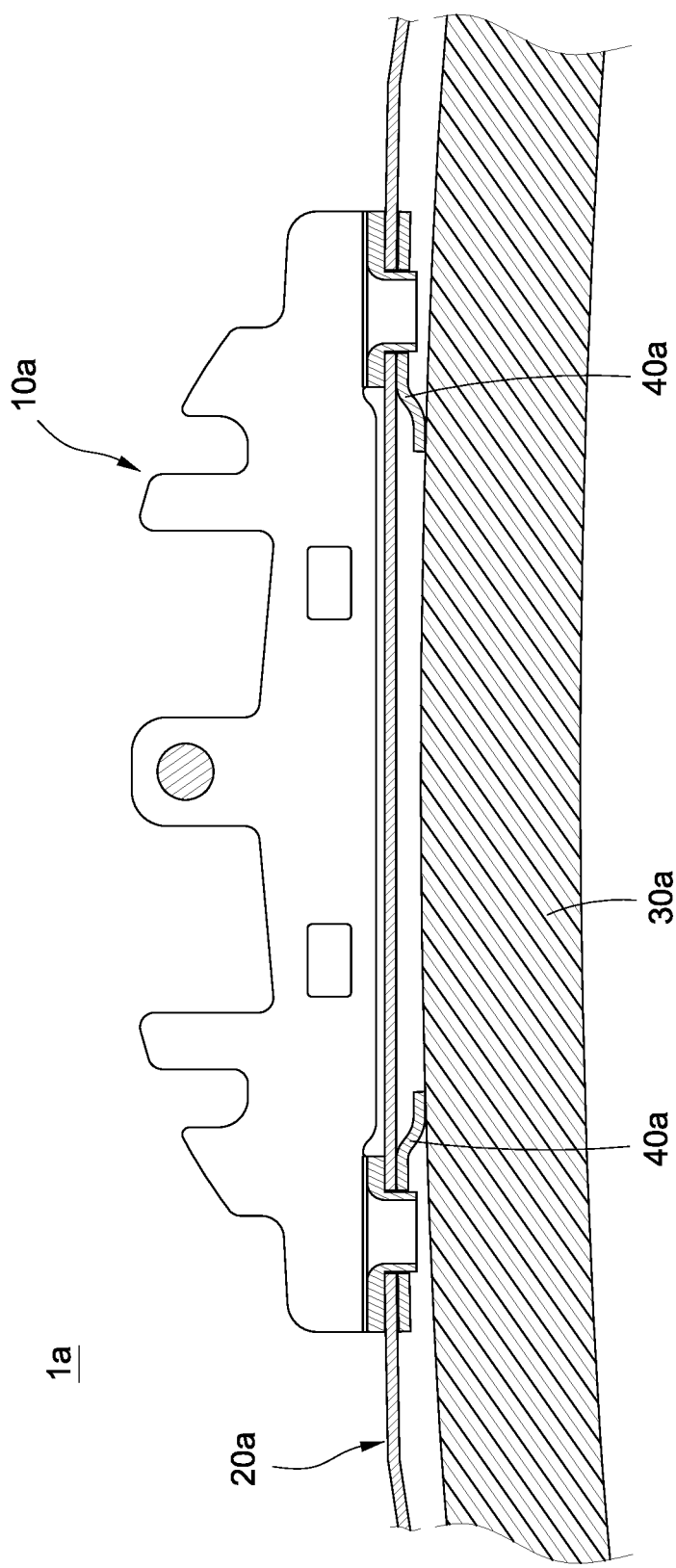
FIG. 6 is a cross-sectional view of another embodiment of the windshield wiper structure with a reinforced pressing force of the disclosure.

Please refer to FIG. 6, which is a cross-sectional view of another embodiment of the windshield wiper structure with a reinforced pressing force of the disclosure. This embodiment is similar to the above embodiment. The windshield wiper structure 1a includes a fixing frame 10a, a support plate 20a, a blade 30a and at least one pressing strip 40a. The difference is the arrangement of the support plate 20a and the pressing strip 40a.

In this embodiment, the support plate 20a is a single piece metal elastic sheet which is extended oppositely from the fixing frame 10a. In addition, the pressing strip 40a is a pair in number. The pair of pressing strips 40a is disposed on the bottom side of the fixing frame 10a correspondingly. The pressing strip 40a may be disposed on the bottom side of the fixing frame 10a by riveting, fastening or welding.

Figure 7:
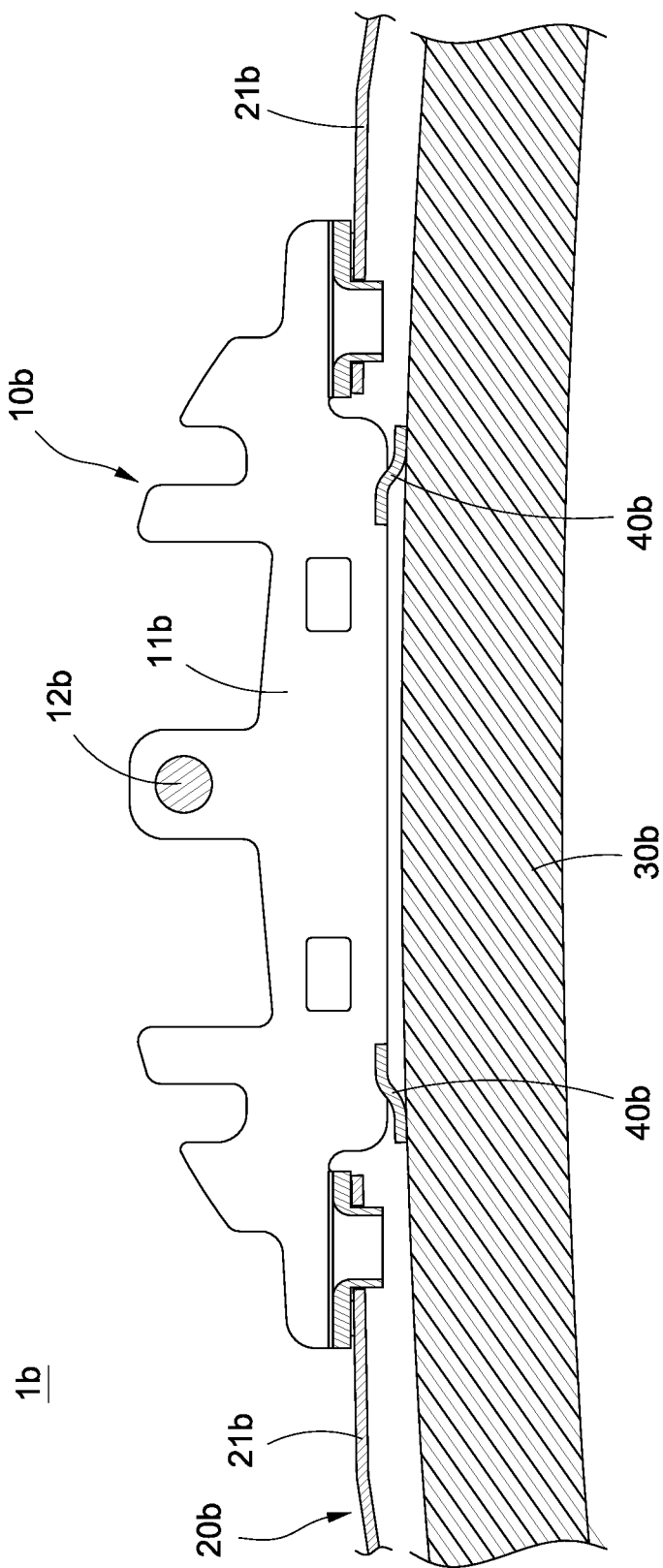
FIG. 7 is a cross-sectional view of still another embodiment of the windshield wiper structure with a reinforced pressing force of the disclosure.

Please refer to FIG. 7, which is a cross-sectional view of still another embodiment of the windshield wiper structure with a reinforced pressing force of the disclosure. This embodiment is similar to the above embodiment. The windshield wiper structure 1b includes a fixing frame 10b, a support plate 20b, a blade 30b and at least one pressing strip 40b. The difference is the arrangement of the support plate 20b and the pressing strip 40b.

In this embodiment, the fixing frame 10b includes a fixing base 11b and a pivot 12b. The support plate 20b includes a pair of elastic sheets 21b extended oppositely from the fixing frame 10b. In addition, the pressing strip 40b is a pair in number. The pair of pressing strips 40b is connected to the bottom portion of the fixing base 11b and located on two sides of the fixing frame 10b. Similarly, the assembling manner of the pair of pressing strips 40b is not limited, it may be disposed on the bottom side of the fixing base 11b by riveting, fastening or welding.

While this disclosure has been described by means of specific embodiments, numerous modifications and variations could be made thereto by those skilled in the art without departing from the scope and spirit of this disclosure set forth in the claims.

What is claimed is:

1. A windshield wiper structure with a reinforced pressing force, the windshield wiper structure comprising:
   a fixing frame, comprising a fixing base and a pivot disposed on the fixing base; wherein a bottom of the fixing base is a hollow-out portion;
   a support plate, connected on a bottom side of the fixing base, and extended oppositely from the fixing base;
   a blade, connected to a bottom surface of the support plate; and
   at least one pressing strip, disposed on the bottom side of the fixing base, and pressing the blade toward a direction away from the fixing base to contact with a glass surface, wherein the at least one pressing strip is step-shaped and enters the hollow-out portion to press the blade right below the hollow-out portion.

2. The windshield wiper structure of claim 1, further comprising: a pair of covers, wherein the support plate comprises a pair of elastic sheets extended oppositely from the fixing base, and the pair of covers correspondingly covers the pair of elastic sheets.

3. The windshield wiper structure of claim 2, wherein each cover comprises a pair of troughs, and two sides of each elastic sheet separately pass through the pair of troughs.

4. The windshield wiper structure of claim 2, further comprising: an accessory seat, mounted on the fixing base and sandwiched between the pair of covers.

5. The windshield wiper structure of claim 1, further comprising: multiple engaging frames, and the blade being mounted on the bottom surface of the support plate through the engaging frames.

6. The windshield wiper structure of claim 5, wherein each elastic sheet comprises multiple insert slots disposed spacedly, and the engaging frames pass through the insert slots respectively to connect with the blade.

7. The windshield wiper structure of claim 1, wherein the pressing strip comprises a flexible bent sheet.

8. The windshield wiper structure of claim 1, wherein the support plate comprises a pair of elastic sheets extended oppositely from the fixing base, the at least one pressing strip is a pair in number, and the pair of pressing strips are separately connected on the pair of elastic sheets and are adjacent to the fixing base.

9. The windshield wiper structure of claim 8, wherein the pressing strip is located on an end of the elastic sheet, and the pressing strip and the elastic sheet are formed in a single piece.

10. The windshield wiper structure of claim 1, wherein the support plate comprises a pair of elastic sheets extended oppositely from the fixing base, the at least one pressing strip is a pair in number, and the pair of pressing strips are connected on a bottom portion of the fixing base and are located on two sides of the fixing frame correspondingly.

* * * * *